Dec. 14, 1926

S. SILBERMAN

ELECTRICAL CONDENSER

Filed July 18, 1925

1,610,980

S. Silberman
INVENTOR
By: Marks & Clark
Attys

Patented Dec. 14, 1926.

1,610,980

UNITED STATES PATENT OFFICE.

SALMAN SILBERMAN, OF PORZ-ON-THE-RHINE, GERMANY.

ELECTRICAL CONDENSER.

Application filed July 18, 1925, Serial No. 44,619, and in Germany July 22, 1924.

Cables, more particularly high tension cables have, as is well-known, high capacities and it has therefore often been the practice to use lengths of cable, when capacities were required. The regular manufacture of condensers in the form of cables has however not proved satisfactory in practice, as the costs of manufacture were too high. On the other hand the possibility of manufacturing condensers in this constructional form would represent an advance in the art, as such condensers could be made by factory methods in any lengths and would therefore be particularly suitable for making units having a considerable capacity. The demand for such large condensers is considerable, for instance for the compensation of the phase displacement, for excess voltage protection and the like.

The invention is illustrated by the accompanying Figs. 1 to 13 of the drawings.

Figure 1:
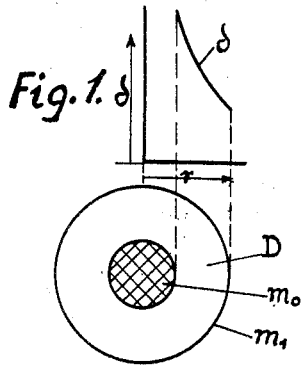

According to the present invention a construction is proposed, which, by a substantially better utilization of the di-electric, enables more capacity to be provided in a condenser having the form of a cable than has been possible heretofore. Hitherto the most satisfactory utilization of the di-electric in a high tension cable could be obtained if, as shown in Fig. 1, the outer diameter of the insulation was made 2.72 times as great as the diameter of the conductor. If however the insulation be subdivided by metallic layers extending throughout the cable, as is shown by way of example in Fig. 2, and if they be connected up in the manner shown in the diagram in Fig. 3, such a cable makes provision for a capacity which is more than twice as great, as in the cable shown in Fig. 1.

Figure 2:
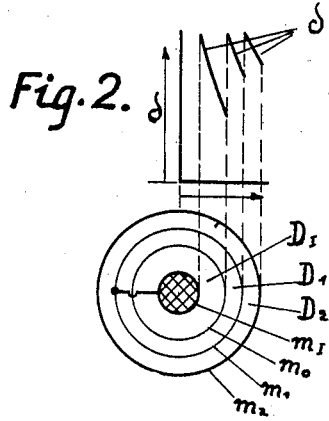

In Figs. 1 and 2: D is the dielectrics, $d$ is the capacities formed by the dielectrics D, $m$ is the metallic layers, $\delta$ is the stress, $r$ is the radius.

Figure 3:
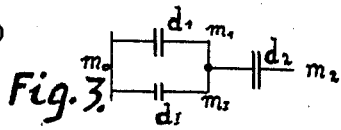

The entire dielectric in Fig. 2 is divided into three parts and the partial capacities $d_1$ and $d_I$ are connected up in parallel to each other and in series with $d_2$ (Fig. 3). The electric stress $\delta$ of the insulating material (gradient) is represented in Figs. 1 and 2 above the sections by curves.

The favourable utilization of the dielectric will now be shown by examples. The capacity of cylindrical condensers may be calculated, as is well known, according to the formula:

$$C = \frac{\epsilon \cdot 0.0555}{\log. \text{ nat. } \frac{d_a}{d_i}} = mfd/km.$$

where $d_a$ and $d_i$ represent the diameters of the two metallic coverings. In the following examples in each case the dielectric constant $\epsilon = 3.8$ and the maximum permissible gradient $\delta$ max. is assumed to be $6kv/mm$. In the condenser according to Fig. 1 for instance for a normal voltage of 60 $kv$. let the diameter of $m_0 = 20mm$. and of $m_1 = 54.4$ mm. The calculated capacity per km. is 0.21 mfd. Let the condenser according to Fig. 2 for the same electrical conditions have the following dimensions $m_I : 12.1$ mm. ext. dia., $m_0 : 27.9$ mm. ext. dia., $m_1 : 40mm$. ext. dia., and $m_2 : 51.4$ mm. ext. dia. With the connections according to Fig. 3 the calculated total capacity will be 0.42 mfd. per km., that is twice as great as previously. If it be taken into account that the cross-sectional area in the first example is 1.125 times as great as that in the second example, the capacity per volume unit of material is 2.25 times greater in the second example, and consequently the manufacturing costs are 2.25 times more favourable.

Figure 5:
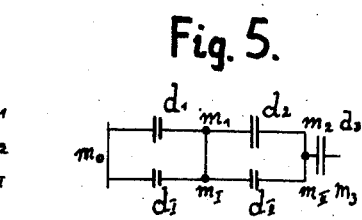
Figure 4:
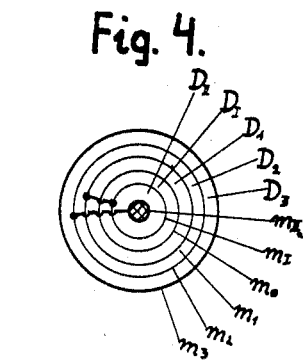
Figure 6:
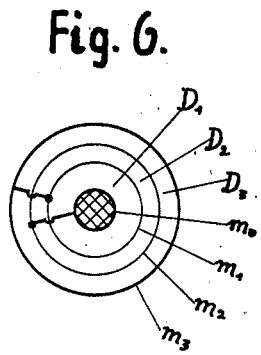
Figure 7:
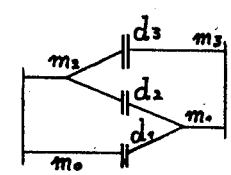
Figure 8:
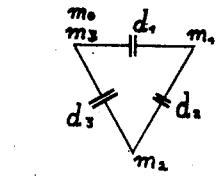
Figure 9:
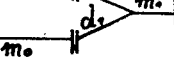

The dielectric can be still better utilized, if a constructional form as that shown in Fig. 4 and the diagram in Fig. 5 be adopted, that is with altogether five partial capacities. By way of example it is proposed to make a cable condenser of the following dimensions: $m_{II}$ of 6 mm. ext. dia., $m_I$ of 15 mm. ext. dia., $m_0$ of 25.2 mm. ext. dia., $m_1$ of 34.2 mm. ext. dia., $m_2$ of 40.2 mm. ext. dia., $m_3$ of 47.5 mm. ext. dia. The calculated capacity in this case as well is 0.42 mfd. per km. and is with respect to unit volume 2.62 times as great as in such constructional form as that in Fig. 1. By increasing the subdivision of the dielectric the utilization of the dielectric can be still further increased.

Figure 10:
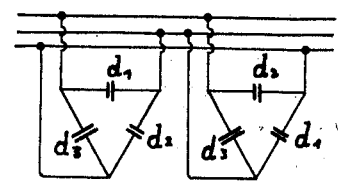
Figure 11:
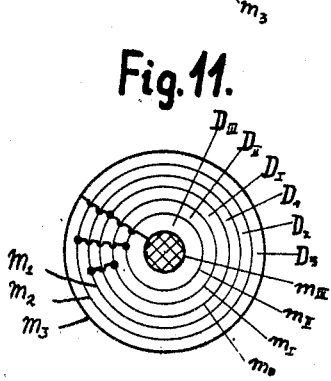
Figure 12:
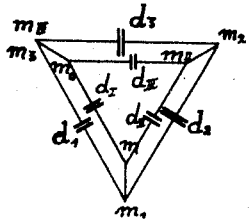

The constructional forms shown in Figs. 2 to 5 are particularly suitable for high voltages. For medium high voltages a favourable utilization of the dielectric can be increased in another manner. Thus for instance the dielectric may be subdivided by metallic layers and all the partial capacities may be connected in parallel with each other, as is shown by way of example in Fig. 6 and the diagrammatic Fig. 7 belonging to it. Or the partial capacities may be so arranged that each is connected up to one phase of a poly-phase network as is shown by way of example in Fig. 8, and in the diagram Fig. 9. The latter system of connections however, has the drawback that the capacities of the separate phases are not equal. This drawback may however be overcome if for instance two or more equal polyphase condensers are used and the partial capacities be connected as indicated in the diagram of Fig. 10. A balance in the capacities in a polyphase condenser may also be effected by a constructional form, such as that shown in Fig. 11 and in the diagram Fig. 12. As will be seen, there are very many advantageous ways of connecting up the capacities, so that for each separate case the best connections may be selected.

The manufacture of the condensers does not provide the slightest difficulties. All the experiences gained in the manufacture of cables may be applied. The core will be preferably made of a metal of sufficient mechanical strength, such as iron or the like. The other intermediate metallic layers may be made of foils, metallized papers, metallic wires and the like and must be such that they put no difficulty in the way of the drying and soaking processes, in so far as such processes are used.

According to the purpose for which they are to be used or to the space available the condensers can be mounted directly on drums or in special casings. The iron band armouring can in most cases be omitted and similarly the metallic cover, in place of which latter a wrapping or the like may be provided. When the condenser is mounted in a casing the latter will preferably be filled with cable oil. This improves both the insulation and cooling conditions.

When a metallic cover is provided, several condensers of one and the same phase or of several phases may be surrounded by a common cover.

Figure 13:
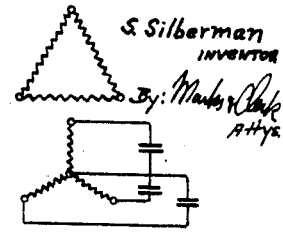

In cases where the working voltage is particularly low, the high voltage condenser should be taken and connected over a transformer to the low voltage, say as shown diagrammatically in Fig. 13. Other well known transformer connections may of course be used.

Preferably the transformer will be placed next to the high tension condenser, which is mounted in a casing. The ends of the high tension condenser may be led directly into the casing of the transformer by a rigid or flexible connection. This provides the advantage that the parts carrying the high voltage are nowhere exposed.

A further considerable simplification is obtained, if the condenser and the transformer are placed in a common casing. In this case a suitable oil filling must be provided.

The condenser provided with a protective cover may also be placed in a casing, the latter being provided with water cooling, which enables the condenser to be more highly stressed and consequently to give a greater output.

The end connections and bushes will be those commonly used in connection with cables. The electric connections between the metallic layers are made in the closing means at the ends and in the sleeves, where the layers are accessible.

What I claim is:—

1. An electric condenser built up in the manner of a cable and comprising a metallic core of sufficient strength, an insulation around the said metal core, a plurality of cylindrical metal insertions embedded in the said insulation and concentric with one another and with the said metal core and metallic connections between some of the said metallic insertions or between some of the said metallic insertions and the core of the cable, and the other metallic insertions lying between those which are metallically connected together.

2. An electric condenser as claimed in claim 1 having a plurality of cores surrounded by a common protecting covering.

3. An electric condenser as claimed in claim 1, in combination with a casing surrounding the said condenser and liquid cooling means as set forth.

4. An electric condenser as claimed in claim 1, having a plurality of cores surrounded by a common protecting covering in combination with a casing surrounding the said condenser and liquid cooling means, as set forth.

5. An electric condenser built up in the manner of a cable and comprising a metallic core of sufficient strength, an insulation around the said metal core, a plurality of cylindrical metal insertions embedded in the said insulation and concentric with one another and with the said metal core, metallic connections between some of the said metallic insertions or between some of the said metallic insertions and the core of the cable and the other metallic insertions lying between those which are metallically connected together and a wrapping around the said insulation.

6. An electric condenser built up in the manner of a cable and comprising a metallic core of sufficient strength, an insulation around the said metal core, a plurality of cylindrical metal insertions embedded in the said insulation and concentric with one another and with the said metal core, metallic connections between some of the said metallic insertions or between some of the said metallic insertions and the core of the cable and the other metallic insertions lying between those which are metallically connected together, a wrapping around the said insulation and a casing, as set forth.

7. An electric condenser as claimed in claim 6 and in which the casing is filled with oil, as set forth.

In testimony whereof I have signed my name to this specification.

SALMAN SILBERMAN.